June 30, 1970  J. J. VAIL ETAL  3,517,957

NIPPLE-ELECTRODE ASSEMBLY AND JOINT AND METHOD OF MAKING SAME

Filed Oct. 23, 1967  2 Sheets-Sheet 1

Inventors
Jack J. Vail
Raymond G. Millette

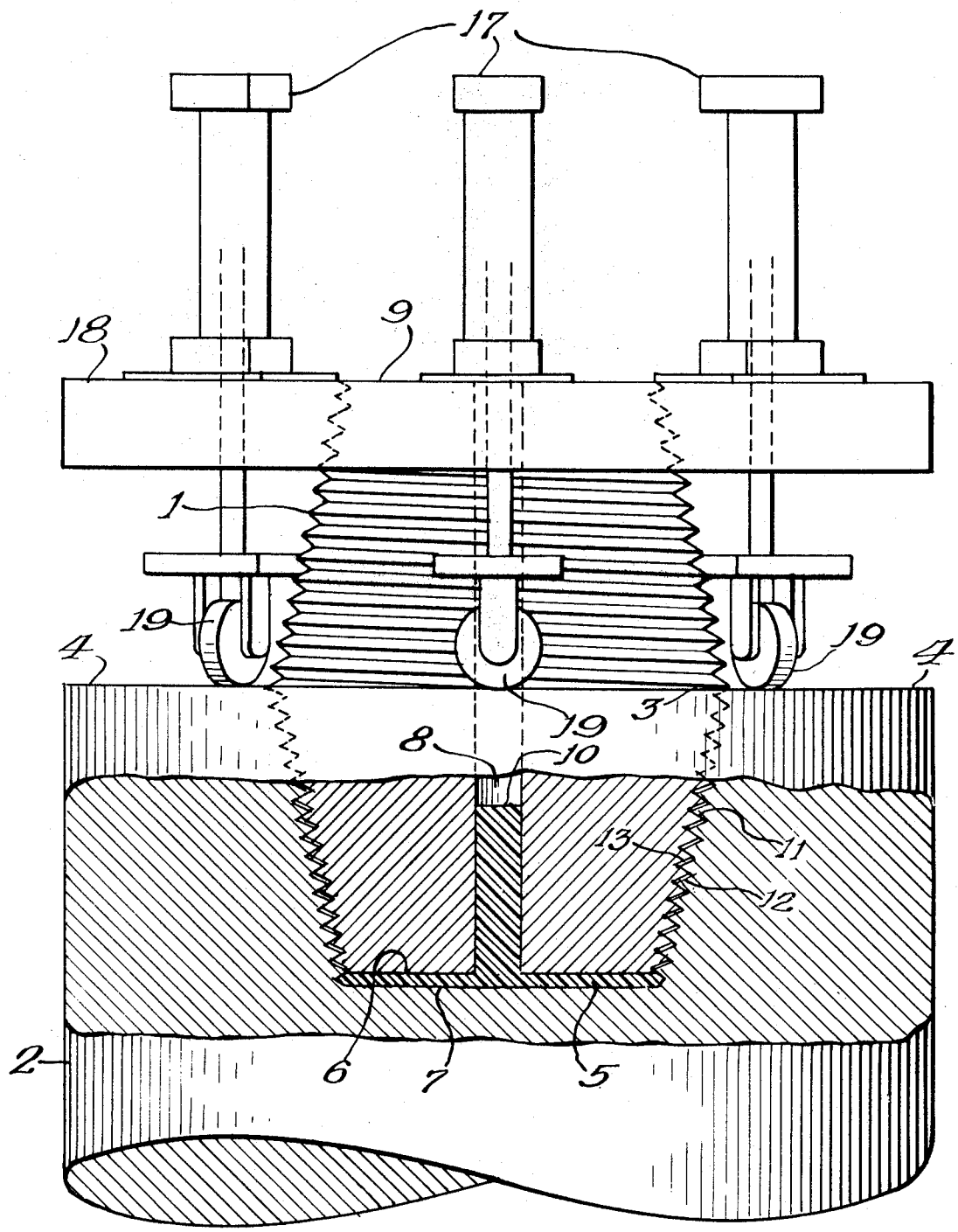

United States Patent Office 3,517,957
Patented June 30, 1970

3,517,957
NIPPLE-ELECTRODE ASSEMBLY AND JOINT AND METHOD OF MAKING SAME
Jack J. Vail, Sanborn, and Raymond G. Millette, Niagara Falls, N.Y., assignors to Great Lakes Carbon Corporation, New York, N.Y., a corporation of Delaware
Filed Oct. 23, 1967, Ser. No. 677,367
Int. Cl. E04g 7/00
U.S. Cl. 287—127        10 Claims

ABSTRACT OF THE DISCLOSURE

The invention relates to nipple-electrode assemblies and joints, such as those used in electric furnaces, and to a means of distributing thread clearance throughout the assembly and/or joint. These means include the pre-positioning of the nipple in the socket of the electrode section into which the nipple is threaded so as to provide a clearance between the non-load bearing flanks of the threads of said threaded nipple and said threaded electrode socket and the placing within the space between the base of the nipple and the bottom of the socket of the electrode section a material which expands upon solidification thereby fixing the nipple in the electrode section after the material has expanded and solidified, thereby maintaining the aforedescribed prepositioning and thread clearance and thereby also providing room for thermal expansion of the threads of the connection. The expandable material typically is introduced within the space between the base of the nipple and the bottom of the socket through a lengthwise hole in the nipple after the nipple has been threaded into the electrode socket.

BACKGROUND OF THE INVENTION

Field of the invention

This invention relates to the field of graphite electrodes such as those used in electric furnaces and like equipment, wherein the electrodes are consumed in use and wherein the electrodes must be continually fed into the furnace or other equipment where they are used.

In order to facilitate this continual feed, the electrode sections are suitably bored and threaded at each end to provide juncture means through a nipple. In this manner, a new electrode is joined to the one being consumed by inserting a nipple into the bore of either the new or partially consumed electrode section and joining the composite electrode section-nipple assembly to the other electrode section. Such nipples and their corresponding bore holes in the electrode sections may have threaded sides which are parallel to the nipple axis. It is generally more customary and advantageous, however, to taper the nipple so that its largest diameter is at its middle and is also at the plane of contact between the electrode sections. Such a tapered nipple is screwed into place in a correspondingly tapered threaded bore or socket of the electrode section with the small diameter end or nipple base going furthest into the electrode body. In threading the tapered nipples for use in joining electrode sections, the thread depth is generally the same whether measured at the small diameter ends or bases or at the large diameter center. It is also usual that in the assembled joint each thread will possess a loaded flank, which is nearer the geometric center of the nipple, and a non-load bearing or idle flank which is opposite to the loaded flank. (That is, the *idle* flank is the flank *nearer* the *ends* of the nipple and the *loaded* flank is the flank *nearer* the *geometric center* of the nipple, and this is how these flanks are defined in the present invention.)

The loaded flank generally carries most, if not all, of the compression stress between the nipple and the electrode sections.

In this type of joint, the half that is assembled first usually contains little or no clearance at the idle flank while maximum clearance occur at the idle flank of the second half assembled.

Description of the prior art

There has been a well recognized need to more evenly distribute the aforedescribed clearance differences in order to reduce or counteract thermal stresses which build up due to lack of expansion room and result in cracking of the joint, and various methods have been proposed by those skilled in the art to accomplish substantially even distribution of thread clearance. For example, this problem and several proposed solutions for same are discussed in United States Pats. Nos. 2,970,854; 2,957,716; 3,088,762; 3,134,616; 3,140,967; and also in German Pat. 1,091,253. The present invention also relates to and is concerned with a more even distribution of clearance between the threads of the nipple and the electrode sockets and consequent reduction in thermal stresses between a nipple and the electrode sections into which it is threaded and offers a novel and advantageous approach for accomplishing this.

SUMMARY OF THE INVENTION

It is an object of the present invention to provide a nipple-electrode section assembly in which there is a more evenly distributed clearance (as compared to conventional commercial practices) between the idle or non-load bearing flanks of the threads of the nipple and the threads of the electrode section socket, so as to provide room for thermal expansion of said threads.

It is another object of this invention to substantially evenly distribute thread clearance throughout a nipple-electrode section assembly, and also throughout an entire electrode joint assembly comprising two electrode sections having threaded sockets in the ends thereof and a nipple threaded into said sockets, joining the electrode sections together.

It is another object of this invention to accomplish the aforesaid more even distribution of thread clearance in an advantageous and practical manner which is also novel as compared to techniques which have been suggested or taught by the prior art for solving this problem.

The invention, in a preferred embodiment, comprises the making of an improved nipple-electrode section assembly, such as just discussed by:

(a) providing a lengthwise hole (e.g. longitudinal hole) between each end of the nipple;
(b) pre-positioning the nipple in the socket of the electrode section so as to provide a clearance between the non-load bearing flanks of the threads of said threaded nipple and said threaded electrode socket; and
(c) introducing a material which expands upon solidification through the hole of the nipple so as to substantly fill the space between the base of the nipple and the bottom of the socket of the electrode section thereby fixing the nipple in the electrode section after said material has expanded and solidified, and thereby also maintaining the pre-positioning and thread clearance of (b) and providing room for thermal expansion of the threads of the connection.

The invention embraces not only the process of making the assembly but also the nipple-electrode-section assembly itself, the process and connection improvements involved, and an electrode joint assembly made by coupling a second electrode-section to the improved nipple-electrode section assembly.

Other objects, and coincident advantages, and a complete understanding of the invention will be apparent to those skilled in the art after a study of the drawings, and a reading of the specification and claims.

BRIEF DESCRIPTION OF THE DRAWINGS

It has been found that the foregoing objects are achievable by making the nipple-electrode section assembly illustrated in vertical cross-section in FIG. 1 and by using this assembly as a part of each joint assembly used in the electrode train. FIG. 2 illustrates auxiliary equipment, viz, a centering jig, which may be used in carrying out the processes of or in making the assembly of the present invention.

DETAILED DESCRIPTION OF THE DRAWINGS AND OF THE PREFERRED EMBODIMENTS

Figure 1:
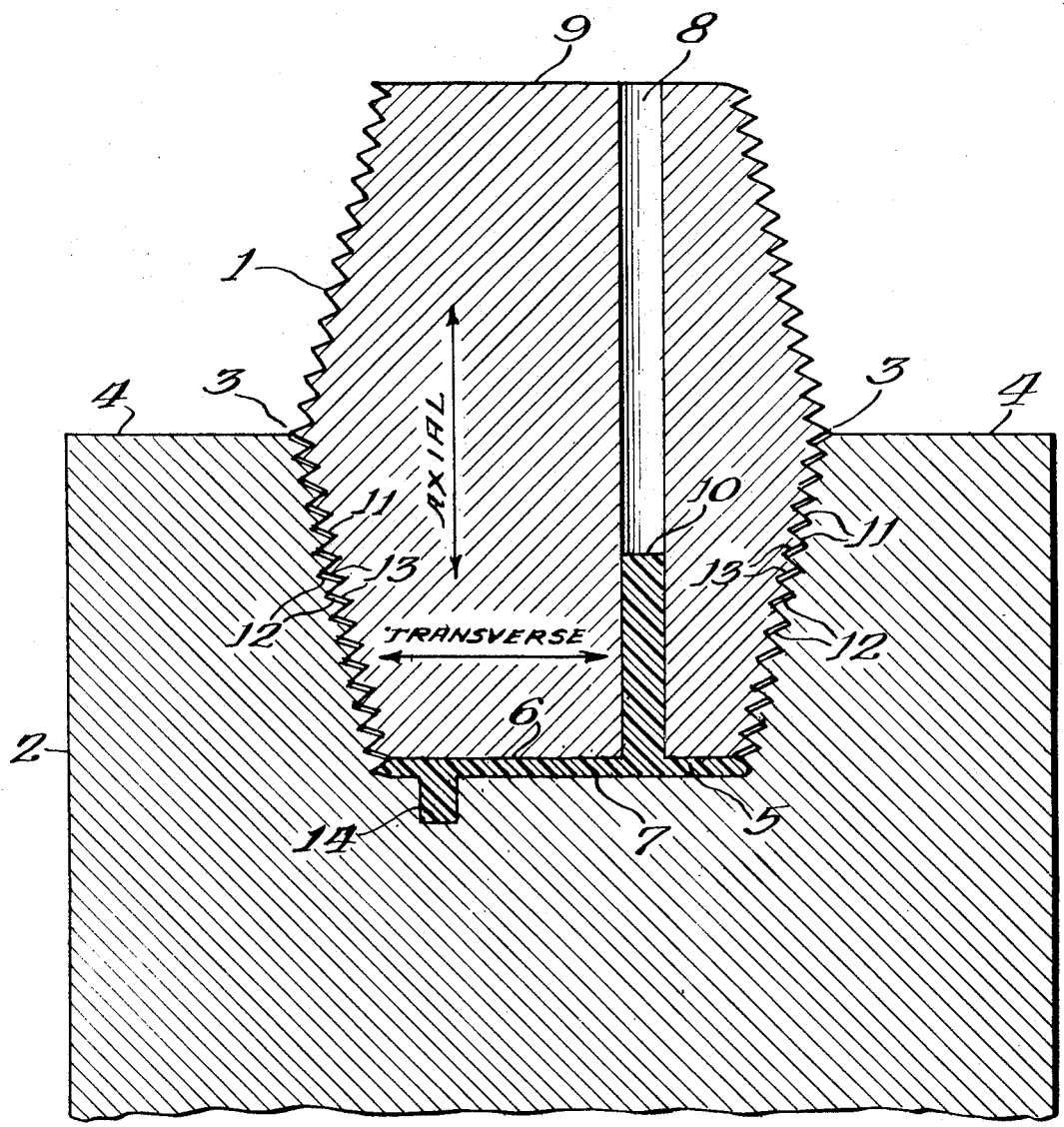

As illustrated in FIG. 1, the nipple 1, which as previously stated is preferably tapered, was threaded into a correspondingly threaded socket of electrode section 2. In the illustrated embodiment, the nipple was provided with a lengthwise (off-center, axial or longitudinal) hole 8 between its ends 6 and 9. Also in this embodiment, the nipple had a major diameter of 10¾", the diameter of the longitudinal hole was 1⅛" and the diameter of the electrode section was 20". The nipple also had a one-third pitch, i.e. three threads per inch, and a taper of 1 to 6, i.e. its radius decreased by one inch for every six inches of length of the nipple away from the maximum diameter. The nipple was threaded into the socket until its major diameter, indicated generally at 3, coincided approximately with the plane of the face 4 of the electrode section and until it has "hand-tight," i.e. until the threads of both the nipple and electrode socket section were completely engaged. The nipple was then pre-positioned in the electrode section socket by being backed-off a slight amount such as an eighth turn (i.e. 45°) so as to provide a clearance between the idle flanks of the threads of said threaded nipple and said threaded electrode socket. A centering jig was employed during the pre-positioning of the nipple. (More is stated regarding this connection with FIG. 2.) A material which has the property of expanding upon solidification, i.e. of exhibiting a cumulative growth during and/or after solidification, after it has been heated and cooled, was then introduced or forced through the hole 8 in an amount sufficient that upon expansion it at least substantially filled the space 5 between the base 6 of the nipple and the bottom 7 of the electrode section socket. (More will be said regarding such expandable materials and their nature or composition hereinafter.) A small excess of the expandable material was employed (and this is typical) and this extended partially up the lengthwise or longitudinal hole at 10. As the material solidified and expanded it substantially or completely filled any void area in the space 5 and also served to fix the nipple in the desired position in the electrode socket. The expansion of the material also maintained the aforediscussed pre-positioning and thread clearance if the nipple, thereby also providing room for thermal expansion of the threads of the connection. The pre-positioning of the nipple also caused the upper faces or load-bearing flanks 11 (viz the flanks nearer the geometric center of the nipple) to contact the mating faces of the threads of the socket and also caused or created a slight gap or clearance 12 at the idle or non-load bearing flanks or sides 13 of the thread, viz the flanks nearer the end 6 of the nipple. (It is clear from the foregoing discussion, of course, that the assembly and the positioning of the members thereof is effected prior to the addition of the assembly to an electrode column on a furnace.)

As illustrated, drilling the longitudinal hole 8 off-center and providing one or more off-center holes 14 in the base of the socket may be resorted to in order to assist in keeping the assembly connection securely in place during handling and the subsequent connection of a second electrode section to the other end of the nipple.

An auxiliary device such as a "centering jig" is used in order to provide optimum pre-positioning of the nipple.

(The "backing-off" of 45° of the nipple in the embodiment just described is satisfactory for a nipple having a pitch and taper as set forth. In a more general sense, the number of degrees "back-off" will depend on the pitch and taper of the nipple because the clearance between the threads is a function of these two variables. For standard nipples having a one-third pitch and a taper of 1 to 6, the number of degrees backed off will typically be a value from about 45° to about 90°; for standard nipples having a one-fourth pitch (4 threads per inch) and a taper of 1 to 6, the number of degrees backed off will typically be a value from about 60° to about 135°.)

In the embodiment of FIG. 2, such a centering jig is illustrated, and is employed in order to pre-position the nipple in the electrode socket and in order to provide a clearance at the idle flank of the threads of the nipple and the internal threads of the electrode section into which the nipple is threaded.

The centering jig consists of an internally threaded plate 18 which is threaded onto one end of the nipple 1. Casters 19 are coupled through holes in the centering plate 1½" diameter bore air cylinders 17. Three casters and three air cylinders are typically used, the casters being so spaced as to form an equilateral triangle against the face 4 of the electrode section 2. A source of air (not shown) provides air under pressure to air cylinders 17. The arrangement is such that the casters 19 push in one direction against the face of the electrode section while the threaded plate 18 pulls the nipple 1 in the opposite direction, thus applying an axial pressure or force upon the nipple and pre-positioning the nipple in the socket of the electrode section, and thus providing a clearance between the non-load bearing or idle flanks 13 of the threads of the nipple and the threads of the electrode section. (Axial and transverse directions are shown in FIG. 1.)

The following discussion of the making of a nipple-electrode section assembly further describes the arrangement of FIG. 2.

The electrode section and nipple were the same size as were employed in the discussion of FIG. 1, as was the diameter of the longitudinal hole 8. The nipple 1 was preheated to 90° C. and was then "hand-tightened" into the socket of the electrode section 2 (i.e. the threads of both the nipple and the socket were completely engaged). The aforedescribed centering jig was then connected to the assembly by threading plate 18, which was 2 inches thick, onto the free end of the nipple. The centering jig device was then "turned on" by pressurizing the air cylinders 17 to 200 p.s.i. each. (Casters 19 were in contact with the face 4 of the electrode section 2.) By doing this an axial force was exerted upon the nipple in a direction away from the electrode section. While this axial force was still being applied, the nipple was backed off 45° thus providing a clearance between the idle flanks 13 of the threads of the nipple and the opposing flanks of the threads of the socket of the electrode section 2 and thus pre-positioning the nipple in the socket of the electrode section. This axial pressure also caused the load-bearing flanks 11 of the threads of the nipple (viz the flanks nearer the geometric center of the nipple) to remain in direct and close contact with the mating threads of the electrode socket. A two-component polyurethane material capable of foaming and becoming rigid when mixed together was then mixed for about 20 seconds and a measured amount of same was injected through the longitudinal hole 8 and into the cavity or space 5 between the base 6 of the nipple and the base or bottom 7 of the electrode section socket. A sufficient amount of the foamable material was employed so as to substantially fill the space 5 and extend well up into the longitudinal bore 8 after foaming and becoming rigid. The nipple-electrode section assembly was in a horizontal position when this was done and the electrode was then rolled 180° in order to assist the foaming material in substantially filling this void space after foaming. The assembly was maintained in a fixed position for approximately 10 minutes, to allow the foaming material to expand, set and become rigid, after which the pressure was released and the jig removed. The specific (floating) position of the nipple in the electrode section socket, previously provided by the centering jig, was maintained by the expansion and setting of the foaming material.

There are several materials which expand upon solidification and which may be used in the space 5 between the base of the nipple and the base of the electrode section socket in the present invention in order to help float the nipple in the socket of the electrode section and in order to maintain the nipple in a fixed position in the electrode socket. Such materials include foaming resins which expand and become rigid upon foaming. Most of these are made by mixing the foamable material with a catalyst and or forming agent just before introducing or injecting the mixture into the aforesaid space. Such foamable resin materials which become rigid upon setting include polyurethane, polystyrene and polyvinyl chloride resin formulations well known to those skilled in the art of making rigid plastic foams.

Beside foaming resins such as just discussed, several molten metal alloys also have the property of expansion upon solidification and may be used in the space 5 in the present invention in order to maintain the desired clearance between the threads and in order to maintain the nipple in a fixed position in the electrode socket. (As the metal solidifies and expands, the nipple 1 is kept or locked in the desired position in the socket of the electrode.) The following compositions, wherein the numbers are approximate percentages by weight and having the properties set forth opposite same, are typical or preferred alloys which may be used:

| Alloy | Properties | |
|---|---|---|
| | Melting temperature or range (° C.) | Electrical resistivity of alloy in ohm-inches |
| (a) 58 bismuth, 42 tin | 138 | $1.35 \times 10^{-5}$ |
| (b) 55.5 bismuth, 44.5 lead | 124 | $3.45 \times 10^{-5}$ |
| (c) 48 bismuth, 28.5 lead, 14.5 tin, 9 antimony | 103-227 | $2.62 \times 10^{-5}$ |
| (d) 15 antimony, 58 tin, 26 tin, 1 copper | 230-280 | $9.82 \times 10^{-5}$ |
| (e) 15 antimony, 82 lead, 3 tin | 275 | $9.49 \times 10^{-5}$ |

Because of the fact that all of the foregoing alloys exhibit a cumulative growth during and after solidification (as a result of expansion either upon being cooled from their molten state to their solid state, and/or because of linear growth after solidification), a very tight connection is made between the nipple and the electrode section which maintains the aforedescribed pre-positioning of the nipple in the electrode socket. The connection so made is also very strong mechanically and has a very low electrical resistance when any of these alloys is used in making the assemblies or joints as described herein.

The use of a hole which extends between each end of the nipple, such as longitudinal hole 8, and particularity also the technique described with reference to FIG. 2, are a preferred means for introducing the expandable material into the space 5 of the present invention. However, the present invention is also intended to include any nipple-electrode section assembly made wherein a material which expands upon solidification is used between the base of the nipple and the bottom of the socket of the electrode section so as to maintain a pre-positioning of the nipple in the socket of the electrode section and a clearance between the non-load bearing flanks of the threads of said threaded nipple and said threaded electrode socket, thereby providing room for thermal expansion of said thread (provided also that the assembly and the positioning of the members thereof is effected prior to the addition of the assembly to an electrode column on a furnace).

As just discussed, the expandable material used in the present invention may be introduced through a longitudinal bore or hole (as illustrateted in FIGS. 1 and 2) after the nipple has been threaded into and pre-positioned in the electrode section socket, as when a centering jig is used; or, a predetermined amount of the expandable material may be poured into the bottom of the electrode-section and the nipple then threaded and pre-positioned in same, using a centering jig to provide a clearance between the non-load bearing flanks of the threads of the nipple and the threads of the electrode socket. The expansion of the material then causes it to press against the base of the nipple to thus maintain the aforesaid pre-positioning of the nipple and thread clearance.

Another alternative is to provide the expandable material through a radial hole in the electrode socket, which hole leads into the space between the base of the nipple and the bottom of the electrode-section socket. (Such an arrangement is illustrated in FIGS. 1, 2 and 4 of U.S. Pat. 3,048,433.)

If the expandable material is introduced into the bottom of the electrode socket, it is of course necessary that the nipple be threaded into the socket before the expansion of the material has occurred. In other words, the nipple is threaded into the socket far enough so that it either contacts the material to be expanded or is very near to contacting it, so that the expansion of the material causes said material to some into forceful contact against the bottom of the nipple. The expansion of said material then maintains the required positioning of the nipple.

When an electrode section-nipple assembly as described herein is added to a second electrode section of an electric furnace column or train, the nipple in the resulting 3-membered joint (viz, two electrode sections with the nipple half-threaded into each) will be so located that there will be a substantially even distribution of clearance between the idle flanks of the threads of both halves of the nipple in the electrode section sockets of the final joint assembly, rather than the common and objectionable condition typically encountered in the prior art of no clearance at the idle flank of the threads of the nipple-half assembled first and maximum clearance at the idle flank of the threads of the second nipple-half assembled. Consequently there is a reduction in the thermal stresses between the nipple and the electrode sections into which it is threaded with the result that there is a reduction in the degree of splitting and breakage of the joint in furnace operation.

The net effect, therefore, of centering or balancing the nipple in the joint, is that there are fewer mechanical breakdowns or failures in the operation of the furnace. There are also other advantages inherent in making the nipple-electrode section assemblies and joints in accordance with the present invention. For example, the incidence of thread stripping from the sockets of the threaded electrode sections is virtually precluded because of the more uniform thread loading attending the centering of the nipple.

It is to be understood that the invention is not limited to the specific details which have been offered merely for illustrative purposes and that modifications may be made within the scope of the appended claims without departing from the spirit of the invention.

We claim:

1. An electrode section-nipple pre-assembly comprising: (1) a cylindrical electrode section containing internally threaded sockets extending into the section from each of its end faces; (2) a threaded nipple threaded into and pre-positioned in one of the sockets of said electrode section so that a space is present between the base of the nipple and the bottom of the electrode section socket and so that the load bearing flanks of the threads of the nipple, which are the flanks nearer to the geometric center than to the ends of the nipple, contact the mating faces of the threads of the electrode section socket; and (3) a material which has expanded and become rigid upon solidification situated within the space between the base of the nipple and the bottom of the socket of the electrode section and which after becoming rigid has substantially filled same, thereby fixing the nipple in the electrode section, and maintaining the aforestated pre-positioning; and said pre-assembly, the positioning of the members thereof, and the expansion of the material (3) having been effected prior to its addition to an electrode column on a furnace; said pre-positioning and fixing of said nipple in said assembly providing a clearance between the non-load bearing flanks of the threads of said threaded nipple and said threaded electrode socket after said material (3) has expanded and solidified thereby providing room for thermal expansion of said threads.

2. A pre-assembly according to claim 1 wherein the threaded socket of the electrode section is tapered and wherein the portion of the nipple threaded into same has a corresponding taper.

3. An electrode joint assembly comprising: (A) two cylindrical electrode sections containing internally threaded sockets extending into the sections from each of their end faces; (B) a threaded nipple threaded into both of the electrode sections and pre-positioned in a socket of one of the electrode sections so that a space is present between the base of the nipple and the bottom of the electrode section socket and so that the load bearing flanks of the threads of the nipple, which are the flanks nearer to the geometric center than to the ends of the nipple, contact the mating faces of the threads of the electrode section socket; and (C) a material which has expanded and become rigid upon solidification situated within the space between the base of the nipple and the bottom of the socket of the electrode section in which the nipple is pre-positioned and which after becoming rigid has substantially filled same, thereby fixing the nipple in the electrode section, and maintaining the aforestated pre-positioning; and said pre-positioning of the nipple in the socket of one of the electrode sections and the expansion of the material (C) having been effected prior to the making of the entire electrode joint assembly; said pre-positioning and fixing of the nipple in the socket of one of the electrode sections providing a clearance between the non-load bearing flanks of the threads of said threaded nipple and said threaded electrode socket after said material (C) has expanded and solidified thereby providing room for thermal expansion of said threads.

4. An electrode joint assembly according to claim 3 wherein the threaded sockets of the electrode sections are tapered and wherein the portions of the nipple threaded into said sockets are correspondingly tapered.

5. In a connection between a threaded nipple and an electrode section containing an internally threaded socket extending into the section from one of its end faces wherein the nipple is threaded into the socket, the improvement wherein:
(a) the nipple has been provided with a lengthwise hole between each end of the nipple;
(b) the said nipple has been pre-positioned in the socket of the electrode section so that a space is present between the base of the nipple and the bottom of the electrode section socket and so that a clearance has been provided between the non-load bearing flanks of the threads of said threaded nipple and the opposing faces of the threads of the electrode sockets, said non-load bearing flanks of the threads being those nearer to the ends than to the geometric center of the nipple; and
(c) a material which expands upon solidification has been introduced through the hole of the nipple and has expanded and become rigid so that it has substantially filled the space between the base of the nipple and the bottom of the socket of the electrode section thereby fixing the nipple in the electrode section and thereby also maintaining the pre-positioning and thread clearance of (b) and providing room for thermal expansion of the threads of the connection.

6. In the process of making a connection between a threaded nipple and an electrode section containing an internally threaded socket extending into the section from one of its end faces which includes the step of threading the nipple into the socket, the improvement which comprises:
(a) providing a lengthwise hole between each end of the nipple;
(b) pre-positioning the nipple in the socket of the electrode section so as to provide a space between the base of the nipple and the bottom of the electrode section socket and a clearance between the non-load bearing flanks of the threads of said threaded nipple and the opposing faces of the threads of the electrode socket, said non-load bearing flanks of the threads being those nearer to the ends than to the geometric center of the nipple; and
(c) introducing a material which expands and becomes rigid upon solidification through the hole of the nipple so that after it has expanded and become rigid it substantially fills the space between the base of the nipple and the bottom of the socket of the electrode section thereby fixing the nipple in the electrode section and thereby also maintaining the pre-positioning and thread clearance of (b) and providing room for thermal expansion of the threads of the connection.

7. A process according to claim 6 wherein there is provided at least one hole in the base of the socket and wherein the hole in the nipple is an off-center, longitudinal hole.

8. A process according to claim 6 wherein in step (b) the nipple is hand-tightened as far as it will go into the electrode socket and is then backed off a slight amount in the procedure of providing the thread clearance of said step.

9. A process according to claim 6 wherein a centering jig is employed to assist in providing the pre-positioning of the nipple and the thread clearance of step (b).

10. A process according to claim 6 wherein either the electrode section or the nipple or both are heated before the expandable solidifying material is introduced through the hole of the nipple and into the space between the base of the electrode socket and the base of the nipple.

References Cited

UNITED STATES PATENTS

| | | |
|---|---|---|
| 2,957,716 | 10/1960 | Kaufmann et al. _____ 287—127 |
| 3,048,433 | 8/1962 | Doetsch. |
| 3,088,762 | 5/1963 | Kaufmann et al. |
| 3,140,967 | 7/1964 | Kaufmann et al. |

DAVID J. WILLIAMOWSKY, Primary Examiner

W. L. SHEDD, Assistant Examiner

U.S. Cl. X.R.

13—18; 29—460; 264—229